US012417468B1

(12) United States Patent
Gu et al.

(10) Patent No.: US 12,417,468 B1
(45) Date of Patent: Sep. 16, 2025

(54) USER ENGAGEMENT MODELING FOR ENGAGEMENT OPTIMIZATION

(71) Applicant: Amazon Technologies, Inc., Seattle, WA (US)

(72) Inventors: Hansu Gu, Bellevue, WA (US); Chunlei Zhang, Redmond, WA (US); Chuanhai Zhang, Linyi (CN); Feng Zhu, Bothell, WA (US); Tian Chen, Redmond, WA (US); Siwei Jia, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 170 days.

(21) Appl. No.: 17/360,929

(22) Filed: Jun. 28, 2021

(51) Int. Cl.
*G06Q 30/0242* (2023.01)
*G06N 20/00* (2019.01)
*G06Q 30/0207* (2023.01)

(52) U.S. Cl.
CPC ......... *G06Q 30/0244* (2013.01); *G06N 20/00* (2019.01); *G06Q 30/0222* (2013.01); *G06Q 30/0243* (2013.01)

(58) Field of Classification Search
CPC ........... G06Q 30/0244; G06Q 30/0243; G06Q 30/0222; G06Q 30/0242
See application file for complete search history.

(56) References Cited

U.S. PATENT DOCUMENTS

| | | | |
|---|---|---|---|
| 7,228,287 B1 | 6/2007 | Samson et al. | |
| 7,610,235 B2 | 10/2009 | Lutnick et al. | |
| 8,175,990 B1 | 5/2012 | Hodjat et al. | |
| 8,230,100 B2 | 7/2012 | Shukla et al. | |
| 8,768,759 B2 | 7/2014 | Ghosh et al. | |
| 8,832,195 B2 | 9/2014 | Rama Rao et al. | |
| 9,413,557 B2 | 8/2016 | Herbrich et al. | |
| 9,573,065 B2 | 2/2017 | Rama Rao et al. | |
| 10,052,560 B2 | 8/2018 | Rama Rao et al. | |
| 10,275,803 B2 | 4/2019 | Riordan et al. | |
| 10,387,901 B1 | 8/2019 | Dong et al. | |
| 10,421,018 B2 | 9/2019 | Rao et al. | |
| 10,628,838 B2 | 4/2020 | Ghosh et al. | |
| 10,926,182 B2 | 2/2021 | Rama Rao et al. | |
| 11,080,336 B2* | 8/2021 | Van Dusen | G06N 5/02 |
| 2012/0158474 A1* | 6/2012 | Fahner | G06Q 30/0211 705/14.13 |

(Continued)

*Primary Examiner* — Azam A Ansari
(74) *Attorney, Agent, or Firm* — Robert C. Kowert; Kowert, Hood, Munyon, Rankin & Goetzel, P.C.

(57) ABSTRACT

Methods, systems, and computer-readable media for user engagement modeling for engagement optimization are disclosed. Based (at least in part) on one or more user engagement models, a user engagement modeling system determines an uplift score for a user of an Internet-accessible service. The uplift score comprises an estimated effect on one or more user engagement metrics of an incentive to interact with the service. The uplift score is determined based (at least in part) on values of the user engagement metric(s) for the user in a treatment group and values of the metric(s) for the user in a control group, in view of propensity score to be in either group. The treatment group is offered the incentive, and the control group is not offered the incentive. The system determines that the user is or is not offered the incentive based at least in part on the uplift score.

20 Claims, 8 Drawing Sheets

(56) References Cited

U.S. PATENT DOCUMENTS

| | | | |
|---|---|---|---|
| 2013/0332260 A1* | 12/2013 | Cheng | G06Q 30/0243 705/14.42 |
| 2019/0311268 A1* | 10/2019 | Tilton | G06N 3/084 |
| 2021/0382952 A1* | 12/2021 | Yates | G06Q 10/06393 |
| 2021/0406931 A1* | 12/2021 | Liu | G06N 20/00 |

* cited by examiner

USER ENGAGEMENT MODELING FOR ENGAGEMENT OPTIMIZATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated.

Web servers and applications backed by distributed systems may provide stores that offer goods and services to consumers. For instance, users may visit an Internet-accessible website, mobile application, or other service to view and purchase goods and services offered for sale by vendors. Some Internet-accessible services include large electronic catalogs of items offered for sale or rental. For an individual item, such catalogs typically include at least one product detail page that specifies various information about the item, such as a description of the item, one or more pictures of the item, as well as specifications (e.g., weight, dimensions, capabilities) of the item. Such stores may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Figure 1A:
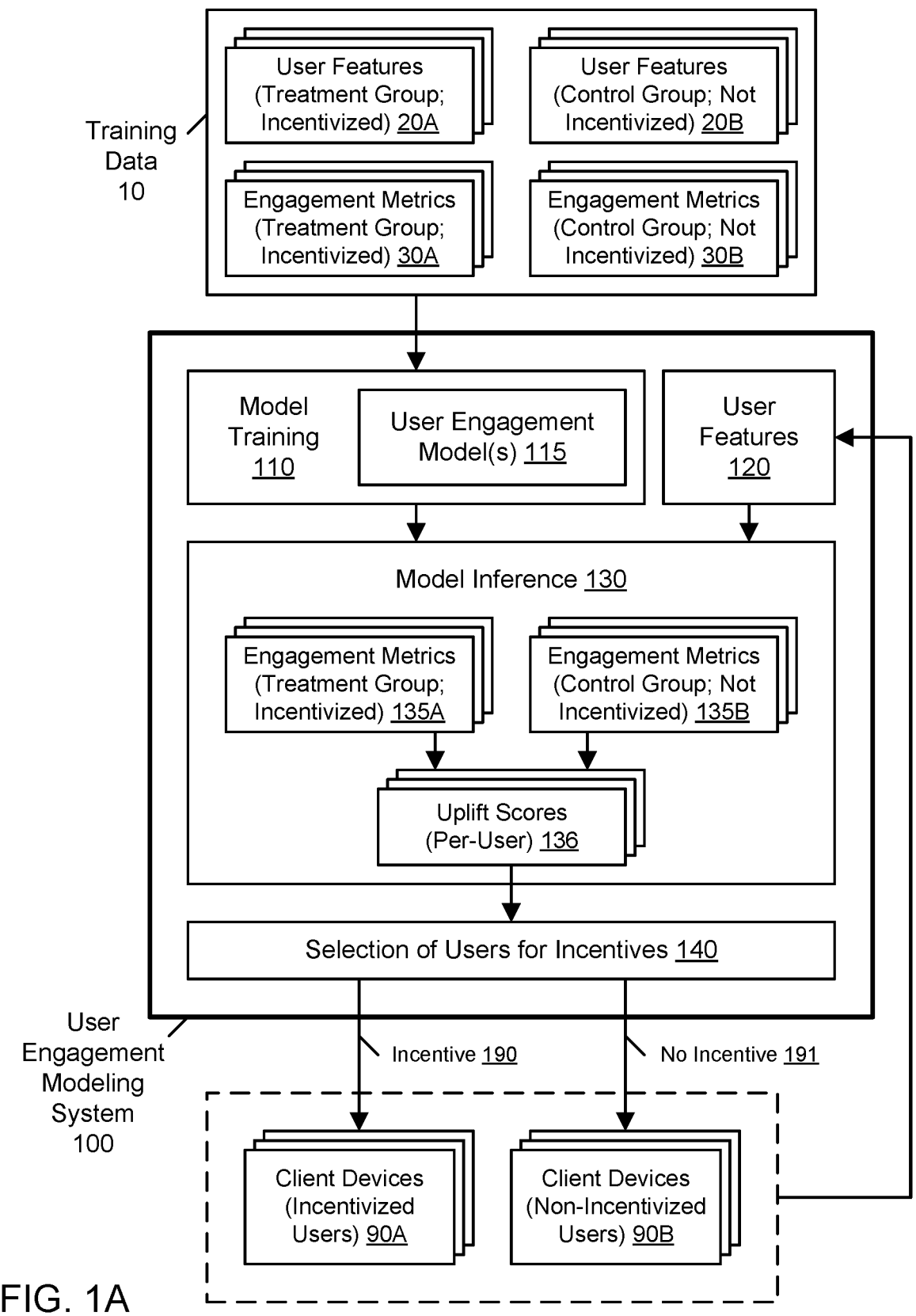
FIG. 1A and FIG. 1B illustrate an example system environment for user engagement modeling for engagement optimization, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for user engagement modeling for engagement optimization are described. Operators of Internet-accessible services (e.g., websites, mobile applications, stores that offer goods and services from catalogs, and other services) may seek to drive users to their services and retain those users over time. User interaction with such a service may be measured by engagement metrics. For example, for a website or mobile application, engagement metrics may be related to page views, average time spent on a page, average session length, number of shares, number of comments, and so on. As another example, for an Internet-accessible store, engagement metrics may be related to purchase frequency, user recommendations of the store, number of reviews, and so on. To improve user engagement metrics, operators of Internet-accessible services may offer incentives. Incentives may include messages or other data sent to users that tend to stimulate or drive user interaction and/or retention with respect to an Internet-accessible service. For example, incentives may include differences in user interface elements (e.g., a greater level of detail in a product page at an online store), higher quality user experiences (e.g., a higher resolution of streaming video or ad-free streaming media), free shipping, expedited shipping, discounts on goods or services, and so on. However, such incentives may be costly for the Internet-accessible services that offer them, e.g., in terms of the computing resources and network resources required to generate and provide the incentives.

The aforementioned challenges, among others, are addressed by embodiments of the techniques described herein, whereby a user engagement modeling system may employ causal machine learning techniques to automatically identify users whose engagement (e.g., with an Internet-accessible catalog, website, application, service, or user interface) is estimated to be improved via incentives. Engagement may be measured by appropriate metrics depending on the nature of users' interaction with the Internet-accessible service and the nature of the incentive. The user engagement modeling system may train and employ one or more machine learning model(s) to generate uplift scores that estimate the effect of an incentive for a particular user, e.g., based (at least in part) on historical data for similar users. Users may be ranked or segmented according to their uplift scores, and users with uplift scores beyond some threshold may be offered an incentive while other users may not be offered the incentive. In training the machine learning model(s), the user engagement modeling system may learn from both customers who received an incentive (a treatment group) and customers who did not receive the incentive (a control group). The user engagement modeling system may use counterfactual modeling techniques to connect "behavioral twins," e.g., to connect a user in the training data set whose behavior with respect to engagement and interaction is most similar to a user whose uplift score is sought to be determined during an inference stage. For a user whose uplift score is sought, the user's past behavior may be provided to the model(s), and the model(s) may estimate one or more engagement metrics if the user is offered the incentive as well as one or more engagement metrics if the user is not offered the incentive. The uplift score may be determined based (at least in part) on a difference or comparison between the incentivized engagement metric estimate and the non-incentivized engagement metric estimate. To optimize user engagement, users with higher uplift scores may be selected for the incentive, and users with lower uplift scores may not be selected for the incentive. Optimization of user engagement may include improving one or more user engagement metrics while reducing the resource usage and cost that would be incurred in providing the incentive to a larger number of users.

As one skilled in the art will appreciate in light of this disclosure, embodiments may be capable of achieving certain technical advantages, including some or all of the following: (1) reducing the use of computing resources associated with generating incentives by limiting incentive offers to a smaller set of users; (2) reducing the use of network resources associated with communicating and providing incentives by limiting incentive offers to a smaller set of users; (3) improving user engagement metrics for a website, mobile application, or other Internet-accessible service; and so on.

Figure 1B:
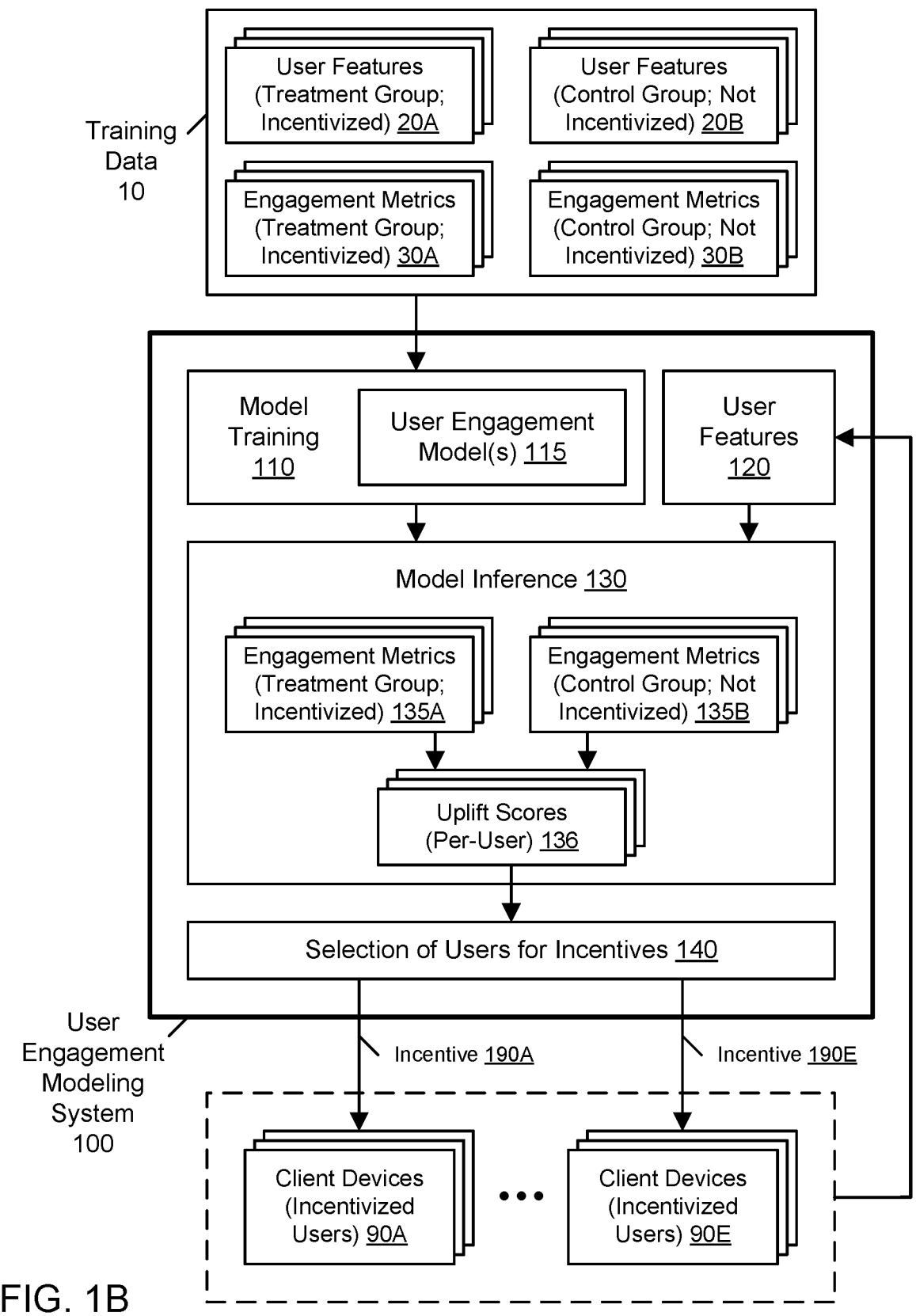

FIG. 1A and FIG. 1B illustrate an example system environment for user engagement modeling for engagement optimization, according to some embodiments. In some embodiments, a user engagement modeling system 100 may employ causal machine learning techniques to automatically identify users whose engagement (e.g., with an Internet-accessible catalog, website, application, service, or user interface) is estimated to be improved via incentives. Engagement may be measured by appropriate metrics depending on the nature of users' interaction with the Internet-accessible service and the nature of the incentive. For example, some users of a website or mobile application may be provided with a different (e.g., more detailed) user interface than other users, such as a more detailed product page for an Internet-accessible store, in order to improve one or more metrics for the incentivized users, such as metrics related to page views, average time spent on a page, average session length, number of shares, number of comments, and so on. However, because the different user interface may use more computing resources to produce, the Internet-accessible service may seek to offer the more detailed page only to those users for whom the incentive is expected to improve their engagement metrics. As another example, a streaming media provider may offer a higher resolution or higher bitrate of streaming video to some users but not others, but such an incentive may use greater amount of computing resources and network resources. As yet another example, some customers of an Internet-accessible catalog may be offered a free shipping incentive, expedited shipping incentive, or premium membership in order to improve one or more metrics for the incentivized users, such as metrics related to purchase frequency, number of store recommendations, number of reviews, revenue, customer retention, and so on. Because such as incentive may be costly, the Internet-accessible store may seek to offer the incentive only to those users for whom the incentive is expected to improve their engagement metrics.

Using a model training 110 component, the user engagement modeling system 100 may train one or more user engagement model(s) 115 to generate uplift scores 136 that estimate the effect of an incentive for a particular user, e.g., based (at least in part) on historical data for similar users. The model(s) 115 may include one or more machine learning models. The model(s) 115 may be trained using a set of training data 10. The training data may include values (e.g., engagement metrics) indicative of behavior of a first plurality of users in a treatment group. The training data may include values (e.g., engagement metrics) indicative of behavior of a second plurality of users in a control group. The treatment group was offered an incentive to interact with an Internet-accessible service, and the control group was not offered the incentive. In some embodiments, the training data 10 may be collected based (at least in part) on one or more experiments in which incentives are offered to some users (the treatment group) and not to other users (the control group). In some embodiments, the training data 10 may be collected based (at least in part) on real-world interactions in which incentives are offered to some users (the treatment group) and not to other users (the control group). For the treatment group of incentivized users, the training data 10 may include user features 20A and values for one or more engagement metrics 30A. For the control group of non-incentivized users, the training data 10 may include user features 20B and values for one or more engagement metrics 30B. In some embodiments, the user features 20A-20B may describe aspects of individual customers (e.g., age, sex, location, and so on, provided that customers have chosen to share this data) as well as aspects of past customer behavior with respect to interactions with the Internet-accessible service. The features 20A-20B may include textual features, graphical features, numerical features, categorical features, and so on. The training data is discussed in greater detail with reference to FIG. 3.

Using a model inference 130 component, the user engagement modeling system 100 may employ the one or more user engagement model(s) 115 to generate uplift scores 136 that estimate the effect of an incentive for a particular user, e.g., based (at least in part) on historical data for similar users. User features 120 may be collected for users whose uplift scores are sought. In some embodiments, the user features 120 may describe aspects of individual customers (e.g., age, sex, location, and so on, provided that customers have chosen to share this data) as well as aspects of past customer behavior with respect to interactions with the Internet-accessible service. The features 120 may include textual features, graphical features, numerical features, categorical features, and so on. The user features 120 may be collected based (at least in part) on interactions with client devices 90A-90B, e.g., over a period of time. The client devices 90A-90B may correspond to a plurality of users.

The model inference 130 may produce uplift scores 136 for individual users. An uplift score may include an estimated effect of an incentive on one or more user engagement metrics for a particular user of the Internet-accessible service. In training the machine learning model(s) 115, the user engagement modeling system 100 may learn from both customers who received an incentive (a treatment group) and customers who did not receive the incentive (a control group). The user engagement modeling system 100 may use counterfactual modeling techniques to connect "behavioral twins," e.g., to connect a user in the training data set 10 whose behavior with respect to engagement and interaction is most similar to a user whose uplift score is sought to be determined during an inference stage 130. For a user whose uplift score is sought, the user's past behavior may be provided to the model(s) via the user features 120, and the model(s) may estimate one or more engagement metrics 135A if the user were offered the incentive as well as one or more engagement metrics 135B if the user were not offered the incentive. The uplift score may be determined based (at least in part) on a difference or comparison between the incentivized engagement metric estimate 135A and the non-incentivized engagement metric estimate 135B. In some embodiments, the uplift score may be determined in view of a propensity score or bias score that estimates the user's likelihood of being in the treatment group or the control group. The propensity scores may permit the system 100 to remove or reduce bias in determining the uplift scores 136.

The uplift scores 136 may be generated using joint optimization of multiple goals, potentially in the presence of constraints, e.g., to maximize one or more goals and minimize one or more other goals. For example, the uplift score may represent not only an attempt to maximize an engagement metric by offering an incentive but also an attempt to reduce the risk that customers avoid signing up for a premium membership as a result of the incentive. In some embodiments, a set of uplift scores may be determined for a particular user, and those scores may collectively be used to select an incentive strategy for that user. For example, the various uplift scores for a user may represent both the impact of the incentive on the user's glance views for web pages and also the user's search frequency. As another example, the various uplift scores for a user may represent both the impact of the incentive on the user's purchase frequency and also the impact of the incentive on the user's premium membership status.

The system 100 may include a component 140 for selection of users for incentives. As shown in FIG. 1A, to optimize user engagement, users 90A with higher uplift scores may be selected for the incentive 190, and users 90B with lower uplift scores may not be selected for the incentive and may be offered no incentive 191. Optimization of user engagement may include improving one or more user engagement metrics while reducing the resource usage and cost of providing the incentive. The model(s) 115 may output the uplift scores 136 for individual users, and the selection component 140 may select one or more of the users 90A for the incentive 190 based at least in part on their uplift scores. The users may be ranked or segmented using their uplift scores 136. In some embodiments, the top N customers 90A in the ranking may be selected for an incentive 190, while the remaining customers 90B may be selected for no incentive 191. In some embodiments, customers 90A with an uplift score that exceeds some threshold may be selected for an incentive, while the remaining customers 90B may not be selected for the incentive 190. In some embodiments, the threshold value of the uplift score may be determined such that N customers exceed the score.

In some embodiments, the incentivized users 90A may be offered the incentive and permitted to accept or decline the incentive (e.g., a free shipping offer). In some embodiments, the incentivized users 90A may be automatically provided with the incentive (e.g., more detailed product pages or higher-quality streaming media) with or without notification of the incentive. The users 90A that are selected for the incentive 190 may be sent data associated with the incentive over the Internet. For example, if the incentive 190 is related to a more detailed user interface, then data of the more detailed user interface may be sent by the Internet-accessible service to an appropriate browser or client application on the user's client device 90A. As another example, if the incentive 190 is related to higher-resolution or higher-streaming media, then data of the higher-quality media may be sent by the Internet-accessible service to an appropriate viewer or client application on the user's client device 90A. As yet another example, if the incentive 190 is related to a free shipping or expedited shipping offer, then notification of the offer may be sent by the Internet-accessible service to an appropriate messaging system or client application on the user's client device 90A. In some embodiments, additional data may be collected for incentivized users and/or non-incentivized users in order to refine the user engagement model(s) 115 and/or the selection 140 of users for incentives. For example, additional values for engagement metrics may be collected over time after incentives are offered or not offered. Based (at least in part) on this refinement process, the system 100 may further improve the selection 140 of users for incentives to optimize one or more goals.

As shown in FIG. 1B, the system 100 may perform selection 140 of users for a range of incentives, such that multiple incentives (or variations of incentives) are offered across a set of users. For example, the system 100 may select one user 90A for one incentive 190A and another user 90E for another incentive 190E. An incentive may have values for parameters, and users 190A through 190E may be offered incentives that represent different parameter values for the same base incentive. For example, if the incentive involves the quality of streaming video, then one variant 190A of an incentive may have one bitrate or maximum resolution parameter value, and another variant 190E of the incentive may have a different bitrate or maximum resolution parameter value. As another example, if the incentive involves a free shipping offer, then parameters of the incentive may include the duration of the offer (e.g., one month, three months, or six months) and/or the type of shipping (e.g., one-day shipping vs. two-day shipping). In some embodiments, an incentive may have a parameter indicating the way in which the offer is communicated to selected users. For example, a user may be notified of an incentive via e-mail, via text, via a notification when the user logs in to a website or begins a checkout process, and so on. In some embodiments, an incentive may have a parameter indicating the duration during which the user can accept the offer before the offer expires (e.g., one day, one week, one month, and so on).

In one embodiment, one or more components of the user engagement modeling system 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the system 100. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the user engagement modeling system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the user engagement modeling system 100, may be offered to clients in exchange for fees.

Figure 7:
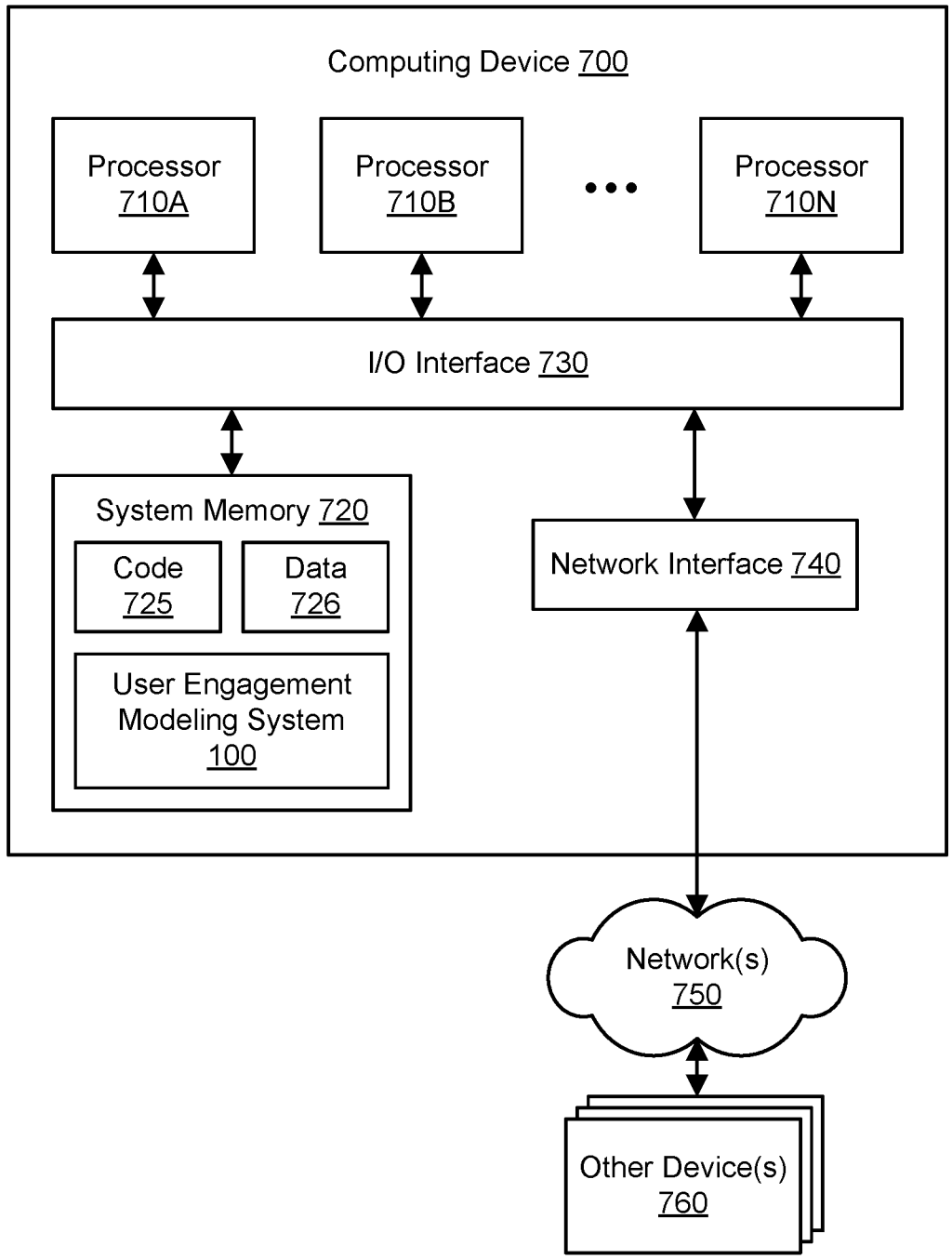
FIG. 7 illustrates an example computing device that may be used in some embodiments.

In various embodiments, components of the system 100 may be implemented using any suitable number and configuration of computing devices, any of which may be implemented by the example computing device 700 illustrated in FIG. 7. In some embodiments, the computing devices may be located in any suitable number of data centers or geographical locations. In various embodiments, at least some of the functionality of the user engagement modeling system 100 may be provided by the same computing device or by different computing devices. In various embodiments, if any of the components of the user engagement modeling system 100 are implemented using different computing devices, then the components and their respective computing devices may be communicatively coupled, e.g., via one or more networks. Any of the components of the user engagement modeling system 100 may represent any combination of software and hardware usable to perform their respective functions. In some embodiments, operations implemented by the user engagement modeling system 100 may be performed automatically, e.g., without a need for user initiation or user intervention after an initial configuration stage, and/or programmatically, e.g., by execution of program instructions on at least one computing device. In some embodiments, the user engagement modeling system 100 may include additional components not shown, fewer components than shown, or different combinations, configurations, or quantities of the components shown.

One or more clients of the user engagement modeling system 100 may represent one or more external devices, systems, or entities with respect to the database. Client devices 90A-90B may be managed or owned by one or more customers or users associated with the user engagement modeling system 100, e.g., users of an Internet-accessible catalog or other service. In one embodiment, the client devices 90A-90B may be implemented using any suitable number and configuration of computing devices, any of which may be implemented by the example computing device 700 illustrated in FIG. 7. Clients 90A-90B may convey network-based service requests to the system 100 via one or more networks, e.g., to request that e-commerce documents be generated or rendered. The network(s) may encompass any suitable combination of networking hardware and protocols necessary to establish network-based communications between client devices 90A-90B and the user engagement modeling system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the user engagement modeling system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the user engagement modeling system 100. In one embodiment, client devices 90A-90B may communicate with the user engagement modeling system 100 using a private network rather than the public Internet. In various embodiments, the various components of the user engagement modeling system 100 may also communicate with other components of the database using one or more network interconnects.

Figure 2:
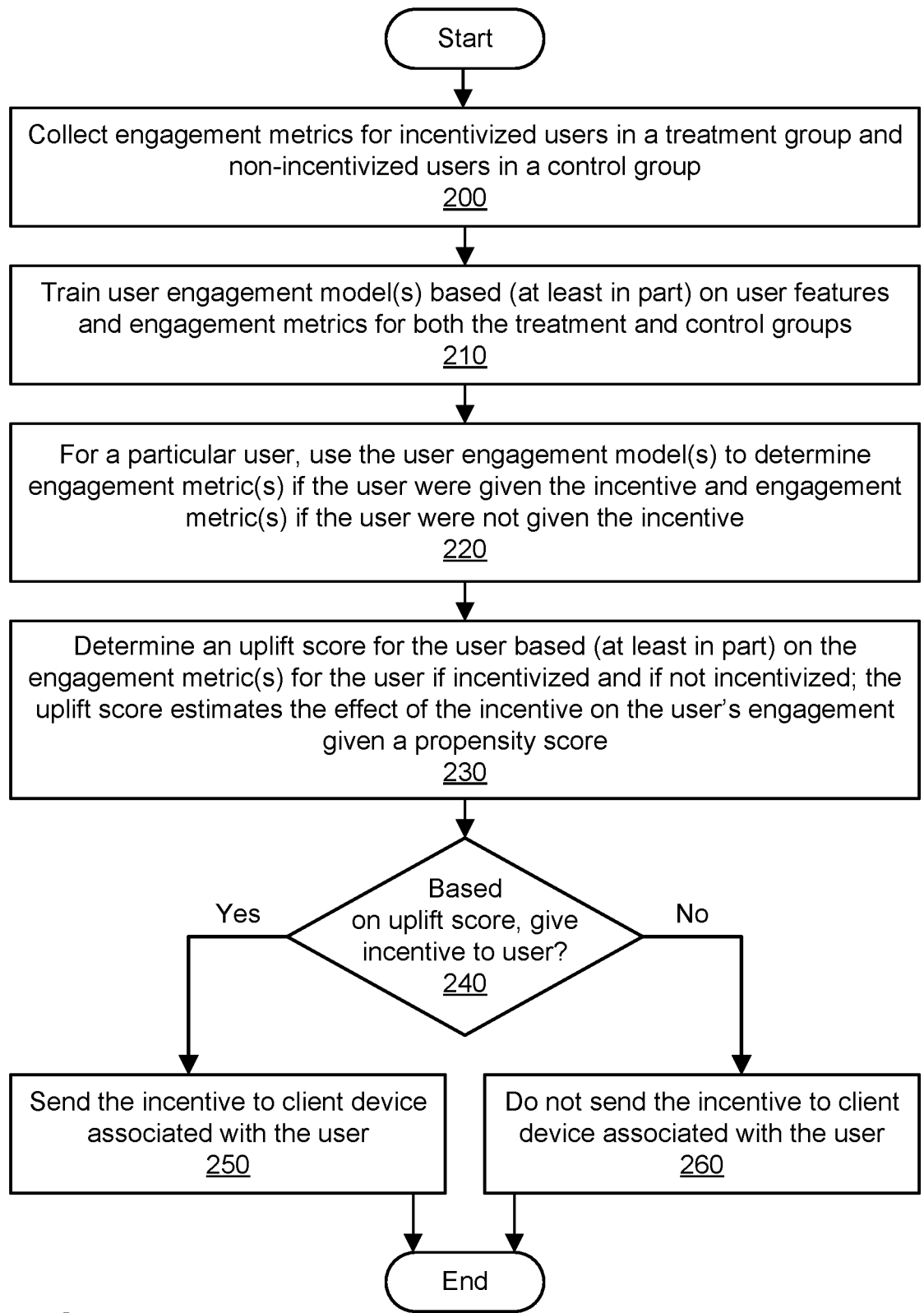
FIG. 2 is a flowchart illustrating a method for user engagement modeling for engagement optimization, according to some embodiments.

FIG. 2 is a flowchart illustrating a method for user engagement modeling for engagement optimization, according to some embodiments. As shown in 200, training data including values for one or more engagement metrics may be collected for incentivized users in a treatment group and also for non-incentivized users in a control group. The treatment group was offered an incentive to interact with an Internet-accessible service, and the control group was not offered the incentive. In some embodiments, the training data may be collected based (at least in part) on one or more experiments in which incentives are offered to some users (the treatment group) and not to other users (the control group). The engagement metric(s) may measure aspects of user engagement or interaction with an Internet-accessible store, website, application, service, or user interface. Engagement may be measured by appropriate metrics depending on the nature of users' interaction with the Internet-accessible service and the nature of the incentive sought to be optimized. For example, metrics may be related to page views, average time spent on a page, average session length, number of shares, number of comments, purchase frequency, number of store recommendations, number of reviews, revenue, customer retention, and so on.

As shown in 210, one or more user engagement models may be trained based (at least in part) on user features and values for one or more engagement metrics for both the treatment and control groups. The model(s) may include one or more machine learning models. The model(s) may be trained using a set of training data that include the user features, the values for the engagement metrics, and an indication of whether individual users were in the treatment group or the control group. The training data may include values (e.g., engagement metrics) indicative of behavior of a first plurality of users in a treatment group with respect to the Internet-accessible service, e.g., in terms of viewing behavior, commenting behavior, sharing behavior, purchasing behavior, and so on. The training data may include values (e.g., engagement metrics) indicative of behavior of a second plurality of users in a control group with respect to the Internet-accessible service, e.g., in terms of viewing behavior, commenting behavior, sharing behavior, purchasing behavior, and so on.

As shown in 220, for a particular user, the user engagement model(s) may determine values for the one or more engagement metrics as if the user were given the incentive and as if the user were not given the incentive. User features may be collected for a user whose uplift score is sought. In some embodiments, the user features may describe aspects of individual customers (e.g., age, sex, location, and so on, provided that customers have chosen to share this data) as well as aspects of past user behavior with respect to interactions with the Internet-accessible service. The features may include textual features, graphical features, numerical features, categorical features, and so on. The model(s) may include a feature encoding layer, a feature enhancement layer, and a feature representation layer. In training the machine learning model(s), the user engagement modeling system may learn from both customers who received an incentive (a treatment group) and customers who did not receive the incentive (a control group). The user engagement modeling system may use counterfactual modeling techniques to connect "behavioral twins," e.g., to connect a user in the training data set whose behavior with respect to engagement and interaction is most similar to the user whose uplift score is sought to be determined during an inference stage.

As shown in 230, an uplift score may be determined for the particular user based (at least in part) on the values for the one or more engagement metrics as if the user were given the incentive and as if the user were not given the incentive. In some embodiments, the uplift score may estimate the effect of the incentive on the user's engagement with the Internet-accessible service. The uplift score may be determined based (at least in part) on a difference or comparison between the incentivized engagement metric estimate and the non-incentivized engagement metric estimate. In some embodiments, the uplift score may estimate the effect of the incentive on the user's engagement given a propensity score or bias score. The propensity score may indicate a likelihood that the user tends to be in the treatment group or in the control group.

As shown in 240, the method may determine whether to give the incentive to the user. Whether to offer or provide the user with the incentive may be determined based (at least in part) on the uplift scores. To optimize user engagement, users with higher uplift scores may be selected for the incentive, and users with lower uplift scores may not be selected for the incentive and may be offered no incentive. Optimization of user engagement may include improving one or more user engagement metrics while reducing the resource usage and cost of providing the incentive. In some embodiments, the top N customers in the ranking may be selected for an incentive, while the remaining customers may not be selected for the incentive. In some embodiments, customers with an uplift score that exceeds some threshold may be selected for an incentive, while the remaining customers may not be selected for the incentive. In some embodiments, the threshold value of the uplift score may be determined such that N customers exceed the score.

If the incentive is given to the user, then as shown in 250, data associated with the incentive may be sent to a client device associated with the user. For example, if the incentive is related to a more detailed user interface, then data of the more detailed user interface may be sent by the Internet-accessible service to an appropriate browser or client application on the user's client device. As another example, if the incentive is related to higher-resolution or higher-streaming media, then data of the higher-quality media may be sent by the Internet-accessible service to an appropriate viewer or client application on the user's client device. As yet another example, if the incentive is related to a free shipping or expedited shipping offer, then notification of the offer may be sent by the Internet-accessible service to an appropriate messaging system or client application on the user's client device. If the incentive is not given to the user, then as shown in 260, data associated with the incentive may not be sent to a client device associated with the user.

Figure 3:
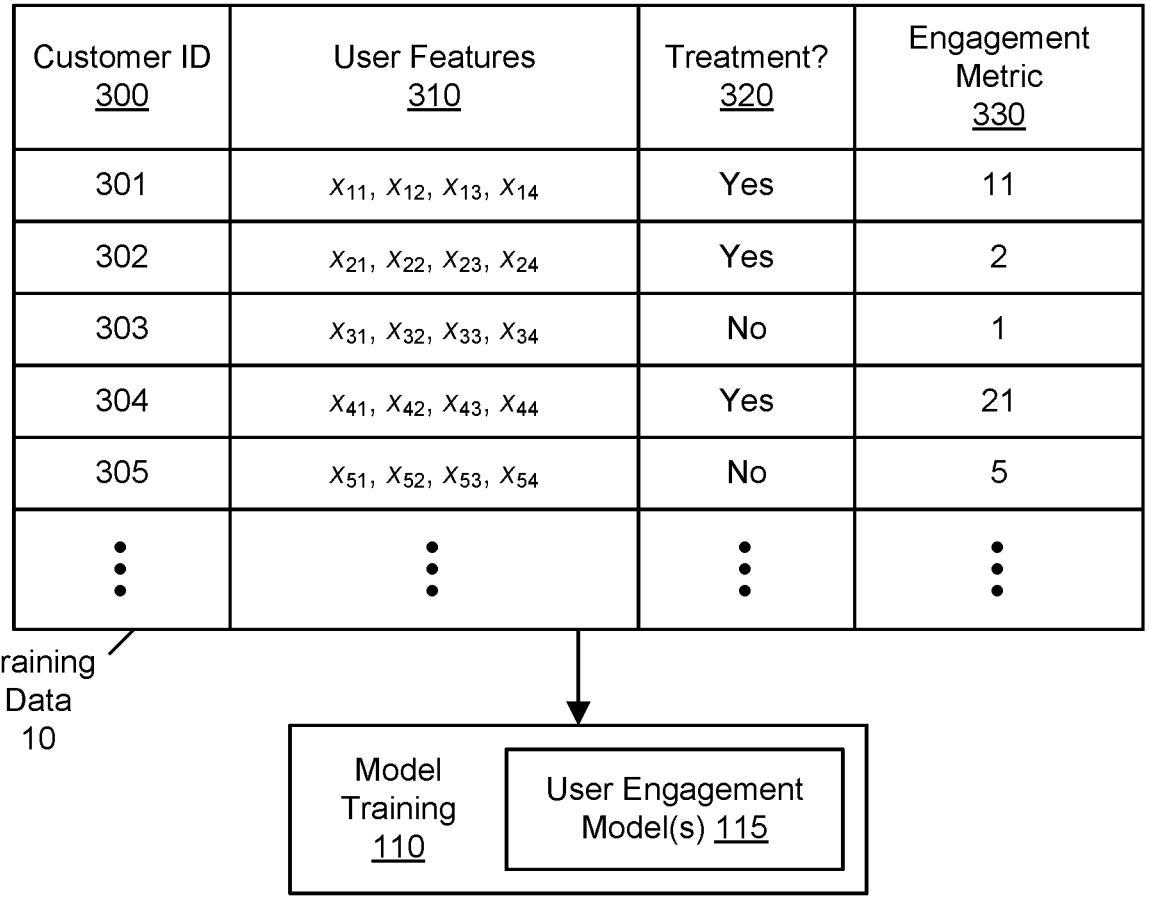
FIG. 3 illustrates further aspects of the example system environment for user engagement modeling for engagement optimization, including examples of training data usable for training user engagement model(s), according to some embodiments.

FIG. 3 illustrates further aspects of the example system environment for user engagement modeling for engagement optimization, including examples of training data usable for training user engagement model(s), according to some embodiments. In some embodiments, in order to perform model training 110 to generate the trained user engagement model(s) 115, one or more prerequisite experiments may be performed to acquire training data 10. In some embodiments, an experiment may randomly select users. For example, one million users may be randomly selected from the user base of the Internet-accessible service, with half being assigned to the treatment group and the other half being assigned to the control group.

In some embodiments, an experiment may be performed based (at least in part) on stratified sampling. Using stratified sampling, users may be segmented initially into groups (strata) of differing perceived value to the Internet-accessible store. The strata may be non-uniform in size. For example, one million users may be segmented into a low purchase intention stratum of 600,000 users, a middle purchase intention stratum of 300,000 users, and a high purchase intention stratum of 100,000 users. Using a stratified sampling approach, the Internet-accessible service may not "waste" incentives on customers who are already expected to have high engagement. In some embodiments, stratified sampling may be performed if no group will have zero probability to be chosen. Within each stratum, the treatment group and control group may be randomly split by half. In some embodiments, given a customer, a model may output the probability $p(t|x)$ of the customer being assigned in the treatment group. In some embodiments, as long as $p(t|x)$ is non-zero for any customer, the training data set 10 may be used for further model training 110. If $p(t|x)$ is zero, then the training data 10 may still be used if the $\hat{g}$ estimator in the training model described below is able to predict the probability sufficiently well.

As shown in the example of FIG. 3, the training data 10 may include columns or fields for customer ID 300, user features 310, an indication as to whether the customer is in the treatment group 320, and a value for an engagement metric 330. For example, customer 301 having features $x_{11}$, $x_{12}$, $x_{13}$, and $x_{14}$ may be in the treatment group and may have an engagement metric value of 11; customer 302 having features $x_{21}$, $x_{22}$, $x_{23}$, and $x_{24}$ may be in the treatment group and may have an engagement metric value of 2; customer 303 having features $x_{31}$, $x_{32}$, $x_{33}$, and $x_{34}$ may be in the control group and may have an engagement metric value of 1; customer 304 having features $x_{41}$, $x_{42}$, $x_{43}$, and $x_{44}$ may be in the treatment group and may have an engagement metric value of 21; and customer 305 having features $x_{51}$, $x_{52}$, $x_{53}$, and $x_{54}$ may be in the control group and may have an engagement metric value of 5. In some embodiments, the customer features 310 may describe aspects of individual customers (e.g., age, sex, location, and so on, provided that customers have chosen to share this data) as well as aspects of past customer behavior with respect to interactions with the Internet-accessible service. The features 310 may include textual features, graphical features, numerical features, categorical features, and so on.

Figure 4:
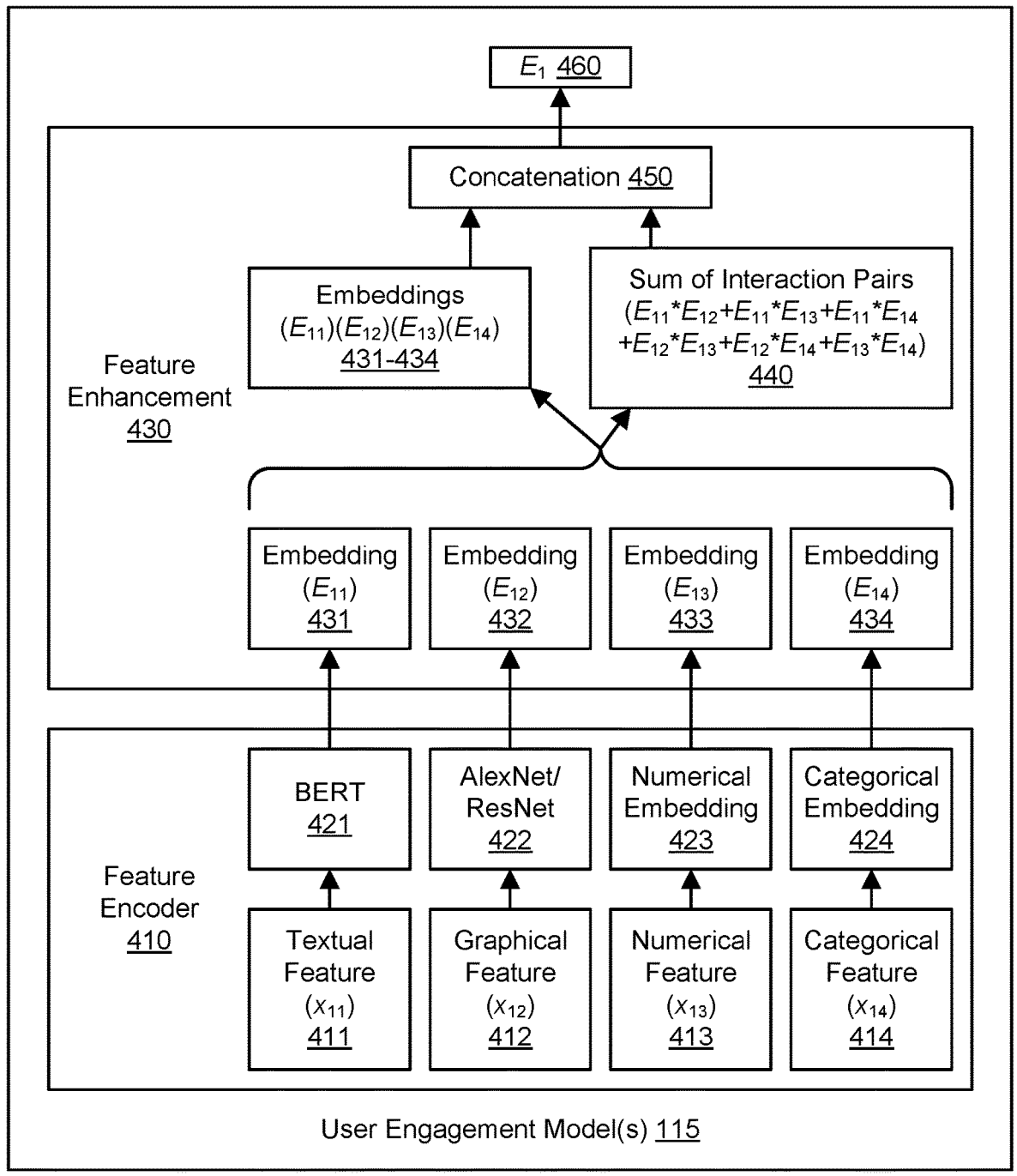
FIG. 4 illustrates further aspects of the example system environment for user engagement modeling for engagement optimization, including feature encoding and feature enhancement of user engagement model(s), according to some embodiments.

FIG. 4 illustrates further aspects of the example system environment for user engagement modeling for engagement optimization, including feature encoding and feature enhancement of user engagement model(s), according to some embodiments. Features such as $x_{11}$, $x_{12}$, $x_{13}$, and $x_{14}$ may be run through a feature encoder 410 and then run through a feature enhancement layer 430. The encoder 410 and enhancement layer 430 may be part of the machine learning model(s) 115. The weight/parameters may be co-trained with the model(s) 115 and fixed during inference 130.

In some embodiments, the input features may vary by feature type. For example, feature $x_{11}$ may include a textual feature 411 such as one or more strings or phrases, feature $x_{12}$ may include a graphical feature 412 such as one or more images, feature $x_{13}$ may include a numerical feature 413 such as one or more numerals (e.g., past purchases by product ID), and feature $x_{14}$ may include a categorical feature 414 such as one or more category identifiers (e.g., the user's sex, interests, or other segment). The various feature types may be encoded into embeddings in different ways. For example, textual feature ($x_{11}$) 411 may be processed using a language model, such as pre-trained BERT (Bidirectional Encoder Representations from Transformers) 421, to generate an embedding ($E_{11}$) 431. The language encoder 421 may have fixed parameters during training 110 and inference 130. As another example, graphical feature ($x_{12}$) 412 may be processed using a pre-trained image recognition model (e.g., AlexNet or ResNet) 422 to generate an embedding ($E_{12}$) 432. The graphical encoder 422 may have fixed parameters during training 110 and inference 130. As a further example, numerical feature ($x_{13}$) 413 may be processed using a numerical embedding model (e.g., a lookup process) 423 to generate an embedding ($E_{13}$) 433. As an additional example, categorical feature ($x_{14}$) 414 may be processed using a categorical embedding model (e.g., a lookup process) 424 to generate an embedding ($E_{14}$) 434. The numerical embedding 433 and categorical embedding 434 may represent parameters of the model(s) 115 and may be randomly initialized from a normal (0,1) distribution and tuned through the training process of the model(s).

In some embodiments, the feature enhancement 430 may capture the interactive effect of all the feature embeddings 431, 432, 433, and 434. The feature enhancement 430 may maintain all of the original embeddings $E_{11}$, $E_{12}$, $E_{13}$, and $E_{14}$. Additionally, the feature embeddings may represent numerical values, and the feature enhancement 430 may calculate the sum of all the possible two-way interactions of the embeddings $E_{11}$, $E_{12}$, $E_{13}$, and $E_{14}$. As shown in the example of FIG. 4, the sum 440 of the interaction pairs may include $E_{11}*E_{12}+E_{11}*E_{13}+E_{11}*E_{14}+E_{12}*E_{13}+E_{12}*E_{14}+E_{13}*E_{14}$. The sum 440 of two-way interactions may be concatenated 450 with the original feature embeddings 431, 432, 433, and 434 and output as embedding $E_1$ 460. Although the complexity of a simple implementation of the sum of all interaction pairs may be $O(n^2)$, the following approach may be used for a complexity of $O(n)$:

$$\sum_{i=1}^{n-1} \sum_{j=i+1}^{n} E_{mi} E_{mj} \approx \left(\sum_{i=1}^{n} E_{mi}\right)^2 - \sum_{i=1}^{n} (E_{mi})^2$$

Figure 5:
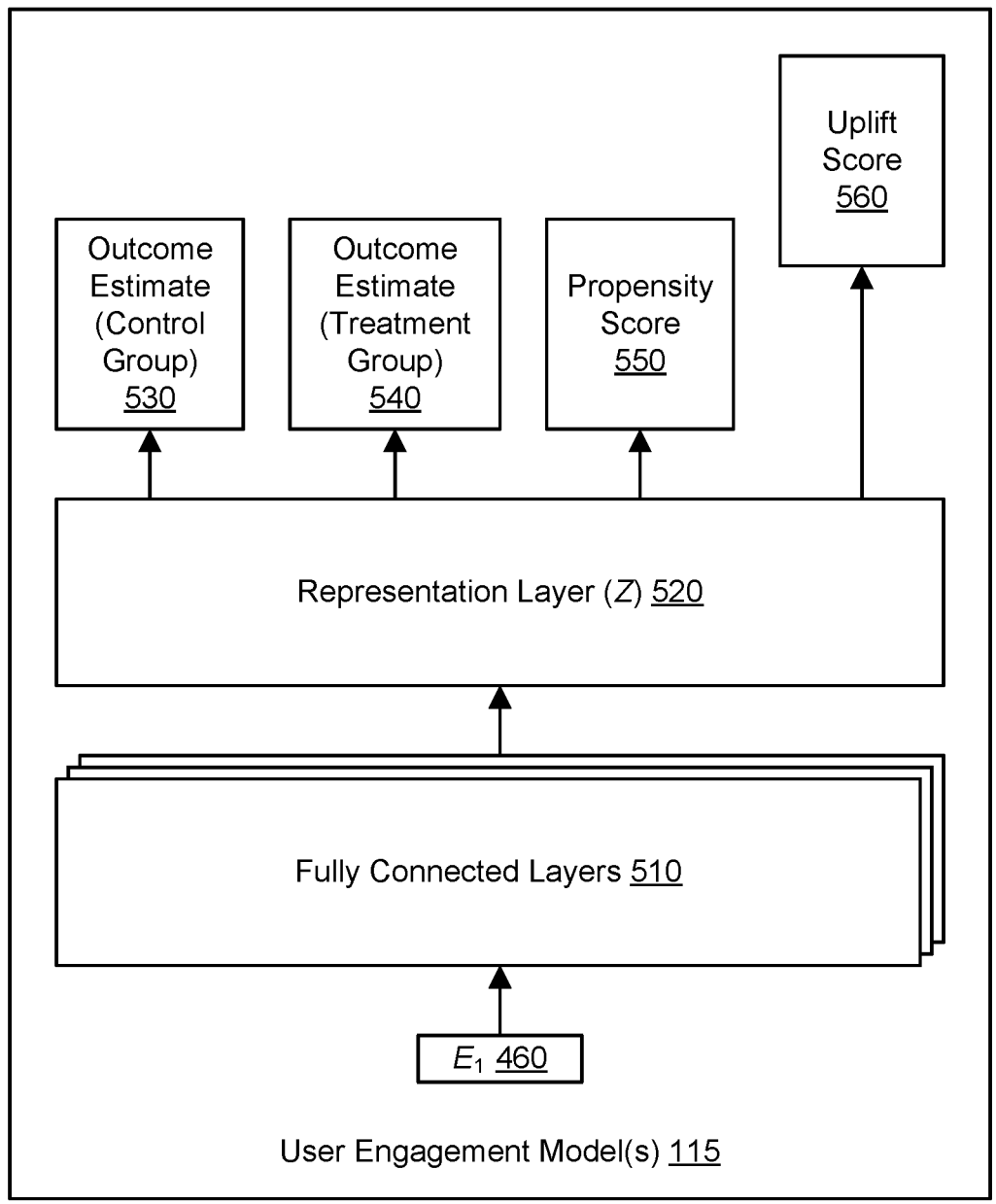
FIG. 5 illustrates further aspects of the example system environment for user engagement modeling for engagement optimization, including outputs of user engagement model(s), according to some embodiments.

FIG. 5 illustrates further aspects of the example system environment for user engagement modeling for engagement optimization, including outputs of user engagement model(s), according to some embodiments. The model(s) 115 may include a plurality of fully connected layers 510. The embedding $E_1$ 460 may be provided as input to the fully connected layers 510. The fully connected layers 510 may include one or more multilayer perceptrons (MLPs). MLPs may represent a class of feedforward artificial neural network (ANN), and one MLP may include at least three layers of nodes: an input layer, a hidden layer, and an output layer. Except for the input nodes, each node may include a neuron that uses a nonlinear activation function. An MLP may utilize a supervised learning technique such as backpropagation for training. In some embodiments, the number of MLPs may be tuned as a hyper-parameter.

The model(s) 115 may include a feature representation layer 520. The feature representation module 520 may include a shared weight module, such that all parameters are shared across multiple tasks and all the features and labels from the data run through a single feature representation and fully train all the parameters. The representation layer 520 may implement a four-task loss that outputs Z. The first task of finding $\hat{Q}(0, x_i)$ may output an outcome estimate 530 for the control (non-incentivized) group to capture an engagement metric for the user if assigned to the control group (the parameter 0=control) and not incentivized. The second task of finding $\hat{Q}(1, x_i)$ may output an outcome estimate 540 for the treatment (incentivized) group to capture an engagement metric for the user if assigned to the treatment group (the parameter 1=treatment) and incentivized. In some embodiments, for each data point, the treatment flag $t_i$ is either 0 or 1, so either $\hat{Q}(0, x_i)$ or $\hat{Q}(1, x_i)$ is effectively minimized. $\hat{Q}(0, x_i)$ and $\hat{Q}(1, x_i)$ may be used in the fourth task to generate the uplift score 560. In some embodiments, the goal of the tasks 530 and 540 may be to find $\hat{Q}(0, x_i)$ and $\hat{Q}(1, x_i)$ that minimize the squared distance to the engagement label (e.g., purchase frequency)$y_i$:

$$\sum \left[ \left(\hat{Q}(0, x_i) - y_i\right)^2 * t_i + \left(\hat{Q}(1, x_i) - y_i\right)^2 * (1 - t_i) \right]$$

In some embodiments, the third task of the representation layer 520 may predict a treatment flag in the experiment. This task may minimize the cross entropy of $\hat{g}=\hat{g}(x_i)$ and $\hat{t}$. This prediction may generate a propensity score 550 for each user to effectively assign a "weight" for this user. If the user has a relatively high propensity score, she or he is more likely to appear in the treatment group and may be deemed less valuable for an incentive offer. If the user has a relatively low propensity score, she or he is less likely to appear in the treatment group and may be deemed more valuable for an incentive offer. In some embodiments, the propensity score 550 may be especially useful when the experiment of assigning users to the treatment group or control group was not purely random. In such circumstances, the propensity score 550 may indicate a degree of bias associated with the user with respect to incentives. For example, if the training data 10 reflected an experiment or use case in which users between ages 18-29 were more likely to be offered an incentive than other users, then then propensity score 550 may be used to account for that bias in the training data. This propensity score 550 may be used in the fourth task to generate the uplift score 560.

In some embodiments, the fourth task of the representation layer 520 may estimate the uplift score 560. The uplift score 560 may be generated based (at least in part) on the outcome estimate 530 for the control group, the outcome estimate 540 for the treatment group, and the propensity score 550. By minimizing a special loss function, the model(s) 115 may ensure a property of double robustness, such that if either propensity estimation $\hat{g}(x_i)$ or outcome estimations $\hat{Q}(0, x_i)$ and $\hat{Q}(1, x_i)$ are accurate, and the uplift score 560 can be accurately estimated. The fourth task may estimate the output $\hat{\psi}=\psi(x_i)$ 560 that minimizes the following loss function, where $\hat{Q}(0, x_i)$, $\hat{Q}(1, x_i)$, and $\hat{g}$ are outputs of the three previous tasks:

$$\gamma = \sum_i \left( \left( \frac{t_i}{\hat{g}(x_i)} - \frac{1-t_i}{1-\hat{g}(x_i)} \right) * (y_i - \hat{Q}(t_i, x_i)) + \hat{Q}(1, x_i) - \hat{Q}(0, x_i) - \psi(x_i) \right)^2$$

In some embodiments, $\hat{Q}(0, x_i)$, $\hat{Q}(1, x_i)$, and $\hat{\psi}$ may be generated for one type of engagement metric. If the model(s) 115 seek to jointly optimize for a plurality of engagement metrics, then a new set of $\hat{Q}(0, x_i)$, $\hat{Q}(1, x_i)$, and $\hat{\psi}$ may be generated by of the model(s) and added to the loss function. A new may be generated as an output score representing the combined metric uplift for the plurality of metrics.

Figure 6:
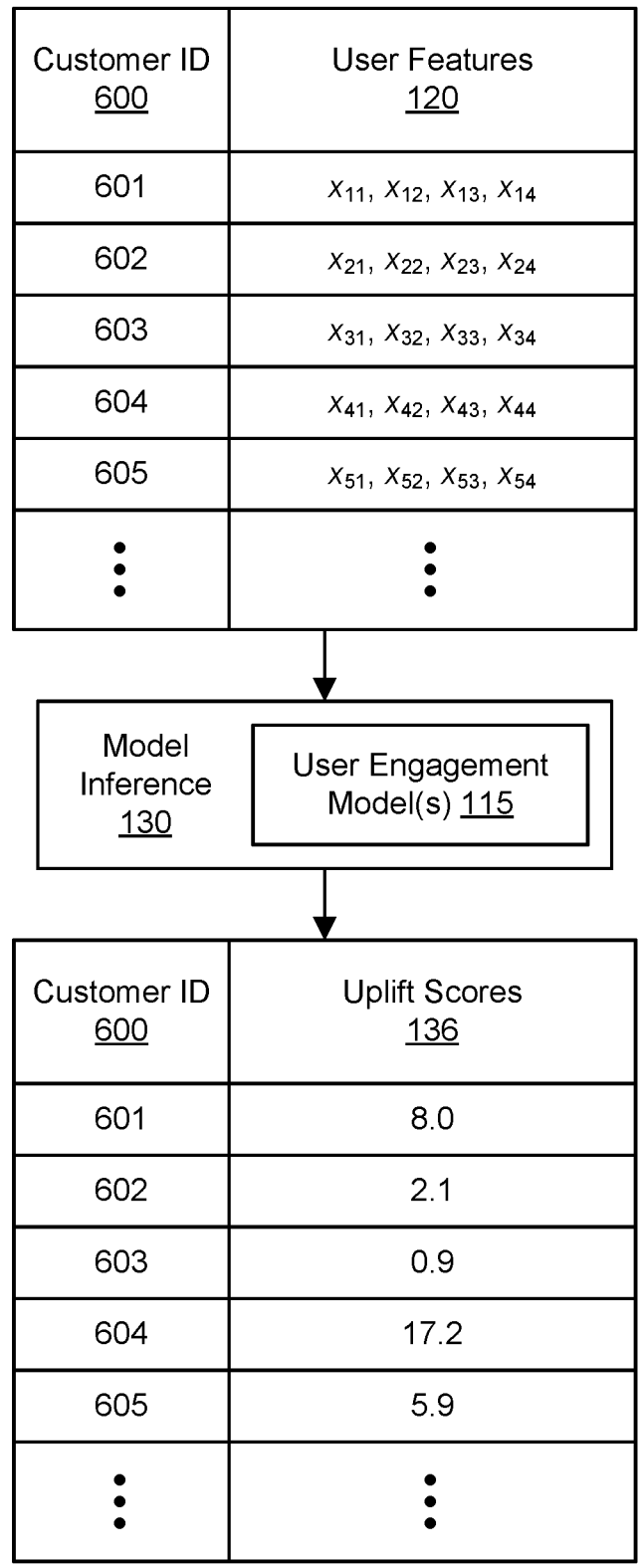
FIG. 6 illustrates further aspects of the example system environment for user engagement modeling for engagement optimization, including the use of user engagement model(s) to produce uplift scores during model inference, according to some embodiments.

FIG. 6 illustrates further aspects of the example system environment for user engagement modeling for engagement optimization, including the use of user engagement model(s) to produce uplift scores during model inference, according to some embodiments. The input to the model inference 130 may include columns or fields for customer ID 600 and user features 120. For example, customer 601 may have features $x_{11}$, $x_{12}$, $x_{13}$, and $x_{14}$; customer 602 may have features $x_{21}$, $x_{22}$, $x_{23}$, and $x_{24}$; customer 603 may have features $x_{31}$, $x_{32}$, $x_{33}$, and $x_{34}$; customer 604 may have features $x_{41}$, $x_{42}$, $x_{43}$, and $x_{44}$; and customer 605 may have features $x_{51}$, $x_{52}$, $x_{53}$, and $x_{54}$. In some embodiments, these customers 601-605 may represent "behavioral twins" with respective customers 301-305. In some embodiments, the customer features 610 may describe aspects of individual customers (e.g., age, sex, location, and so on, provided that customers have chosen to share this data) as well as aspects of past customer behavior with respect to interactions with the Internet-accessible service. The features 610 may include textual features, graphical features, numerical features, categorical features, and so on.

The model(s) 115 may output the uplift scores 136 for individual users 601-605. For example, customer 601 may have an uplift score of 8.0, customer 602 may have an uplift score of 2.1, customer 603 may have an uplift score of 0.9, customer 604 may have an uplift score of 17.2, and customer 651 may have an uplift score of 5.9. The customers may be ranked or segmented using their uplift scores. In some embodiments, the top N customers in the ranking may be selected for an incentive, while the remaining customers may not be selected for the incentive. In some embodiments, customers with an uplift score that exceeds some threshold may be selected for an incentive, while the remaining customers may not be selected for the incentive. In some embodiments, the threshold value of the uplift score may be determined such that N customers exceed the score. The users that are selected for the incentive may be sent data associated with the incentive over the Internet. For example, if the incentive is related to a more detailed user interface, then data of the more detailed user interface may be sent by the Internet-accessible service to an appropriate browser or client application on the user's client device. As another example, if the incentive is related to higher-resolution or higher-streaming media, then data of the higher-quality media may be sent by the Internet-accessible service to an appropriate viewer or client application on the user's client device. As yet another example, if the incentive is related to a free shipping or expedited shipping offer, then notification of the offer may be sent by the Internet-accessible service to an appropriate messaging system or client application on the user's client device.

Illustrative Computer System

In at least some embodiments, a computer system that implements a portion or all of one or more of the technologies described herein may include a computer system that includes or is configured to access one or more computer-readable media. FIG. 7 illustrates such a computing device 700 according to one embodiment. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720, e.g., as code (i.e., program instructions) 725 and data 726. In the illustrated embodiment, program code implementing aspects of the user engagement modeling system 100 may be stored in system memory 720.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface

740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:
1. A system, comprising:
a user engagement modeling system comprising one or more processors and one or more memories to store computer-executable instructions that, when executed, cause the one or more processors to:
train one or more user engagement models for estimating user engagement metric values, said train based at least in part on a training data set for users having user features, wherein the training data set comprises:
values for the user features,
values of engagement metrics indicative of behavior of a first plurality of the users in a treatment group offered an incentive to interact with an Internet-accessible catalog, the incentive comprising greater detail in a user interface wherein the greater detail comprises a higher bitrate or higher resolution for a streaming media; and
values of engagement metrics indicative of behavior of a second plurality of the users in a control group not offered the incentive;
determine, based at least in part on application of the trained one or more user engagement models to data comprising values for user features for a first user of the Internet-accessible catalog, one or more values of one or more incentivized user engagement metrics if the first user were offered the incentive and one or more values of one or more non-incentivized user engagement metrics if the first user were not offered the incentive;

determine an uplift score for the first user based at least in part on:
a difference between the one or more values of one or more incentivized user engagement metrics if the first user were offered the incentive and one or more values of one or more non-incentivized user engagement metrics if the first user were not offered the incentive, and
a propensity score based on one or more values for user features for the first user, the propensity score indicating a degree of bias for users with one or more user features similar to those of the first user being in the treatment group or in the control group of the training data,
wherein the uplift score estimates an effect of the incentive on the first user's engagement given the propensity score;
determine that the first user is offered the incentive based at least in part on determining that the uplift score, that is based at least in part on the propensity score and the difference between the one or more values of the one or more incentivized user engagement metrics if the first user were offered the incentive and the one or more values of the one or more non-incentivized user engagement metrics if the first user were not offered the incentive, exceeds a threshold; or
determine that the first user is not offered the incentive based at least in part on determining that the uplift score, that is based at least in part on the propensity score and the difference between the one or more values of the one or more incentivized user engagement metrics if the first user were offered the incentive and the one or more values of the one or more non-incentivized user engagement metrics if the first user were not offered the incentive, does not exceed the threshold.

2. The system as recited in claim 1, wherein the incentive comprises greater detail in a user interface associated with the Internet-accessible catalog, and wherein the one or more user engagement metrics comprise a page view metric.

3. The system as recited in claim 1, wherein the one or more memories store additional computer-executable instructions that, when executed, cause the one or more processors to:
determine one or more additional uplift scores, wherein the first user is offered the incentive or not offered the incentive based at least in part on maximizing the uplift score and minimizing at least one of the additional uplift scores.

4. The system as recited in claim 1, wherein the first user is offered the incentive using data sent via the Internet to a client device associated with the user.

5. A method, comprising:
determining, by a user engagement modeling system, data comprising values for user features for a first user of an Internet-accessible service to be considered for an incentive comprising greater detail in a user interface wherein the greater detail comprises a higher bitrate or higher resolution for a streaming media;
determining, by the user engagement modeling system based at least in part on application of one or more user engagement models trained to accept the determined data comprising values for user features for the first user as input, one or more values of one or more incentivized user engagement metrics if the first user were offered the incentive and one or more values of one or more non-incentivized user engagement metrics if the first user were not offered the incentive;
determining an uplift score for the first user of the Internet-accessible service based at least in part on:
a difference between the one or more values of one or more incentivized user engagement metrics if the first user were offered the incentive and one or more values of one or more non-incentivized user engagement metrics if the first user were not offered the incentive, and
a propensity score based on one or more values for user features for the first user, and the propensity score indicating a degree of bias for users with one or more user features similar to those of the first user being in a treatment group of a training data offered the incentive or in a control group of a training data not offered the incentive,
wherein the uplift score estimates an effect of the incentive on the first user's engagement given the propensity score; and
determining, by the user engagement modeling system, that the first user is offered the incentive based at least in part on the uplift score, that is based at least in part on the propensity score and the difference between the one or more values of the one or more incentivized user engagement metrics if the first user were offered the incentive and one or more values of the one or more non-incentivized user engagement metrics if the first user were not offered the incentive, exceeds a threshold; or
determining, by the user engagement modeling system, that the first user is not offered the incentive based at least in part on the uplift score, that is based at least in part on the propensity score and the difference between the one or more values of the one or more incentivized user engagement metrics if the first user were offered the incentive and the one or more values of the one or more non-incentivized user engagement metrics if the first user were not offered the incentive, does not exceed the threshold.

6. The method as recited in claim 5, further comprising:
training, by the user engagement modeling system, the one or more user engagement models based at least in part on a training data set, wherein the training data set comprises a plurality of values indicative of behavior of a first plurality of users in the treatment group and a second plurality of users in the control group.

7. The method as recited in claim 5, further comprising:
determining, by the user engagement modeling system, one or more additional uplift scores, wherein the first user is offered the incentive or not offered the incentive based at least in part on the one or more additional uplift scores.

8. The method as recited in claim 5, further comprising:
determining, by the user engagement modeling system, a sum of interaction pairs between individual ones of a plurality of feature embeddings that encode the user features for the first user; and
generating, by the user engagement modeling system, a concatenation of the sum of interaction pairs and the plurality of feature embeddings.

9. The method as recited in claim 8, further comprising:
determining, by the user engagement modeling system based at least in part on the concatenation, the propensity score for the first user; and
wherein the uplift score is determined to minimize a loss function associated with the propensity score.

10. The method as recited in claim 5, wherein the one or more user engagement models comprise one or more machine learning models, and wherein the one or more machine learning models comprise a plurality of fully connected layers.

11. The method as recited in claim 5, wherein the incentive comprises greater detail in a user interface.

12. The method as recited in claim 5, wherein the one or more user engagement metrics comprise a page view metric.

13. One or more non-transitory computer-readable storage media storing program instructions that, when executed on or across one or more processors, perform:
    determining data comprising values for user features for a first user of an Internet-accessible service, the first user to be considered for an incentive associated with use of the Internet-accessible service, the incentive comprising greater detail in a user interface wherein the greater detail comprises a higher bitrate or higher resolution for a streaming media;
    estimating, by a user engagement modeling system and based at least in part on application of one or more user engagement models trained to take, as input, the data comprising values for user features for the first user of the Internet-accessible service, one or more values of one or more incentivized user engagement metrics if the first user were offered the incentive and one or more values of one or more non-incentivized user engagement metrics if the first user were not offered the incentive;
    determining, by the user engagement modeling system, an uplift score for the first user of the Internet-accessible service based at least in part on:
        a difference between the one or more values of one or more incentivized user engagement metrics if the first user were offered the incentive and one or more values of one or more non-incentivized user engagement metrics if the first user were not offered the incentive, and
        a propensity score based on one or more values for user features for the first user, the propensity score indicating a degree of bias for users with one or more user features similar to those of the first user being in a treatment group of a training data offered the incentive or in a control group of a training data not offered the incentive,
        wherein the uplift score estimates an effect of the incentive on the first user's engagement given the propensity score; and
    determining, by the user engagement modeling system, that the first user is offered the incentive based at least in part on determining that the uplift score, that is based at least in part on the propensity score and the difference between the one or more values of the one or more incentivized user engagement metrics if the first user were offered the incentive and the one or more values of the one or more non-incentivized user engagement metrics if the first user were not offered the incentive, exceeds a threshold; or
    determining, by the user engagement modeling system, that the first user is not offered the incentive based at least in part on determining that the uplift score, that is based at least in part on the propensity score and the difference between the one or more values of the one or more incentivized user engagement metrics if the first user were offered the incentive and the one or more values of the one or more non-incentivized user engagement metrics if the first user were not offered the incentive, does not exceed the threshold.

14. The one or more non-transitory computer-readable storage media as recited in claim 13, further comprising additional program instructions that, when executed on or across the one or more processors, perform:
    training, by the user engagement modeling system, the one or more user engagement models based at least in part on a training data set, wherein the training data set comprises a plurality of values indicative of behavior of a first plurality of users in the treatment group and a second plurality of users in the control group.

15. The one or more non-transitory computer-readable storage media as recited in claim 13, further comprising additional program instructions that, when executed on or across the one or more processors, perform:
    training, by the user engagement modeling system, the one or more user engagement models based at least in part on a training data set, wherein the training data set comprises a first plurality of values indicative of behavior of users in the treatment group in a first user stratum and users in the control group in the first user stratum, wherein the training data set comprises a second plurality of values indicative of behavior of users in the treatment group in a second user stratum and users in the control group in the second user stratum, and wherein the first user stratum differs from the second user stratum in user engagement with the Internet-accessible service.

16. The one or more non-transitory computer-readable storage media as recited in claim 13, wherein the incentive comprises one or more values for one or more parameters, wherein a variant incentive comprises one or more different values for the one or more parameters, and wherein the first user is offered either the incentive or the variant incentive.

17. The one or more non-transitory computer-readable storage media as recited in claim 13, further comprising additional program instructions that, when executed on or across the one or more processors, perform:
    determining, by the user engagement modeling system, a sum of interaction pairs between individual ones of a plurality of feature embeddings that encode the user features for the first user; and
    generating, by the user engagement modeling system, a concatenation of the sum of interaction pairs and the plurality of feature embeddings.

18. The one or more non-transitory computer-readable storage media as recited in claim 17, further comprising additional program instructions that, when executed on or across the one or more processors, perform:
    determining, by the user engagement modeling system based at least in part on the concatenation, the propensity score for the first user; and
    wherein the uplift score is determined to minimize a loss function comprising the propensity score.

19. The one or more non-transitory computer-readable storage media as recited in claim 13, wherein the incentive comprises a higher bitrate or higher resolution for streaming media.

20. The one or more non-transitory computer-readable storage media as recited in claim 13, wherein the one or more user engagement metrics comprise a media viewing duration metric or a media viewing frequency metric.

\* \* \* \* \*